United States Patent
Toda et al.

(10) Patent No.: US 10,359,014 B2
(45) Date of Patent: Jul. 23, 2019

(54) SOUND SYSTEM FOR VEHICLE

(71) Applicant: Mazda Motor Corporation, Aki-gun, Hiroshima (JP)

(72) Inventors: Isao Toda, Hatsukaichi (JP); Kenji Asada, Higashihiroshima (JP); Katsumasa Sogame, Higashihiroshima (JP); Hironobu Hashiguchi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/970,560

(22) Filed: May 3, 2018

(65) Prior Publication Data
US 2018/0328321 A1 Nov. 15, 2018

(30) Foreign Application Priority Data

May 11, 2017 (JP) .................................. 2017-094620

(51) Int. Cl.
*H04B 1/00* (2006.01)
*F02M 35/12* (2006.01)
(Continued)

(52) U.S. Cl.
CPC ..... *F02M 35/1294* (2013.01); *B60R 11/0217* (2013.01); *B60W 50/14* (2013.01);
(Continued)

(58) Field of Classification Search
CPC .......... F02M 35/1294; B60R 11/0217; B60W 50/14; B60W 2050/143; H04R 1/323
(Continued)

(56) References Cited

U.S. PATENT DOCUMENTS

| 2004/0032955 A1* | 2/2004 | Hashimoto | ............. H04S 1/002 |
| | | | 381/18 |
| 2006/0062411 A1* | 3/2006 | Sako | ....................... H04S 3/002 |
| | | | 381/310 |

(Continued)

FOREIGN PATENT DOCUMENTS

| DE | 10016104 A1 | 10/2001 |
| EP | 1936605 A2 | 6/2008 |

(Continued)

OTHER PUBLICATIONS

European Patent Office, Extended European Search Report Issued in Application No. 18000412.9, dated Oct. 10, 2018, Germany, 10 pages.

*Primary Examiner* — Xu Mei
*Assistant Examiner* — Ammar T Hamid
(74) *Attorney, Agent, or Firm* — Alleman Hall Creasman & Tuttle LLP (57) ABSTRACT

A sound system for a vehicle is provided, which includes as sound sources disposed at given positions of the vehicle, an engine and an audio device for an internal space of a cabin. The system includes an engine sound localizer configured to localize a first sound generated by the engine to cause a vehicle driver inside the cabin to hear the first sound from a first position, and an audio sound localizer configured to localize a second sound generated by the audio device to cause the driver to hear the second sound from a second position. The first and second positions are located forward of the driver in front-and-rear directions of the vehicle and separated from each other by a given distance.

5 Claims, 5 Drawing Sheets

(51) Int. Cl.
*G06F 3/16* (2006.01)
*G10K 11/18* (2006.01)
*H04S 7/00* (2006.01)
*B60R 11/02* (2006.01)
*B60W 50/14* (2012.01)
*H04R 1/32* (2006.01)
*G10K 15/02* (2006.01)
*H04R 1/02* (2006.01)

(52) U.S. Cl.
CPC .............. *G06F 3/165* (2013.01); *G10K 11/18* (2013.01); *G10K 15/02* (2013.01); *H04R 1/323* (2013.01); *H04S 7/302* (2013.01); *B60W 2050/143* (2013.01)

(58) Field of Classification Search
USPC ..................................... 381/86, 310, 120, 87
See application file for complete search history.

(56) References Cited

U.S. PATENT DOCUMENTS

| | | | |
|---|---|---|---|
| 2013/0272536 A1* | 10/2013 | Tzirkel-Hancock | H04S 7/303 381/86 |
| 2014/0119566 A1 | 5/2014 | Hiramoto et al. | |
| 2014/0252792 A1* | 9/2014 | Roggenkamp | F02M 35/1294 296/70 |
| 2015/0258930 A1* | 9/2015 | Nakayama | H04R 5/023 381/86 |

FOREIGN PATENT DOCUMENTS

| | | |
|---|---|---|
| JP | H0585288 A | 4/1993 |
| JP | 2776092 B2 | 7/1998 |
| JP | 2004271983 A | 9/2004 |

* cited by examiner

SOUND SYSTEM FOR VEHICLE

TECHNICAL FIELD

The present disclosure relates to sound systems for vehicles.

BACKGROUND OF THE DISCLOSURE

Vehicles are generally equipped with audio devices that play an audio sound in a cabin. JP2776092B and JP1993-085288A disclose audio devices that perform localization of an audio sound so that a person(s) on board is able to hear the audio sound from a given position in a cabin.

Meanwhile, vehicles which are focused on the enjoyment of traveling, such as sports cars, are required to actively cause person(s) on board, especially a vehicle driver, to hear (listen to) an engine sound. That is, since the engine sound is a good indication of a vehicle state, it becomes an extremely important element in the enjoyment of traveling, and how to effectively cause the person(s) on board to hear the engine sound is important. Additionally, in order to actively cause the person(s) on board to hear the engine sound, distinguishing an audio sound from the engine sound and how to effectively cause the person(s) to hear it become important.

SUMMARY OF THE DISCLOSURE

The present disclosure is made in view of the above situations and aims to provide a sound system for a vehicle, which is capable of clearly distinguishing an engine sound and an audio sound from each other while actively causing person(s) on board to hear the engine sound.

In order to achieve the above aim, according to one aspect of the present disclosure, a sound system for a vehicle is provided, which includes an engine and an audio device for an internal space of a cabin as sound sources disposed at given positions of the vehicle. The system includes an engine sound localizer configured to localize a first sound generated by the engine to cause a vehicle driver inside the cabin to hear the first sound from a first position, and an audio sound localizer configured to localize a second sound generated by the audio device to cause the driver to hear the second sound from a second position. The first and second positions are located forward of the driver in front-and-rear directions of the vehicle and separated from each other by a given distance.

According to this structure, since the engine sound and the audio sound are heard from positions that are different from each other and forward of the driver where he/she focuses while driving, the driver is able to easily distinguish the engine sound and the audio sound. That is, while hearing the audio sound, the driver is able to clearly recognize a state of the vehicle (especially, a change in the engine sound) based on the engine sound.

The first position may be located upward of (higher than) the second position. Since it is easier for the driver to recognize sound more clearly when the localized position is higher, this location is preferable for causing the driver to hear the engine sound as the main sound and grasp the vehicle state based on the engine sound.

The vehicle may include an instrument panel and a front windshield extending upward from a front-end part of the instrument panel. The first position may be set in the front windshield, and the second position may be set in the instrument panel. It is easier for the driver to recognize sound more clearly when the localized position is higher, and the driver visually recognizes a forward area through the front windshield while driving. Therefore, setting the localized position of the engine sound sufficiently high causes the driver to hear the engine sound as the main sound from the position where the driver focuses and also hear the audio sound from the general instrument panel.

The vehicle may include an instrument panel and a front windshield extending upward from a front-end part of the instrument panel. The first position may be set in the instrument panel, and the second position may be set in the front windshield. It is easier for the driver to recognize sound more clearly when the localized position is higher, therefore, setting the localized position of the audio sound sufficiently high causes the driver to hear the audio sound as the main sound and also hear the engine sound from the instrument panel.

The engine may be disposed in an engine bay formed forward of a dashboard defining a front end of the cabin. The dashboard may be formed with a highly-sound-transparent section where transparency of the engine sound is higher than other sections. In this case, the engine sound from inside the engine bay is transmitted effectively toward the cabin through the high-sound-transparent section formed in the dashboard.

The highly-sound-transparent section may face into the instrument panel, and the engine sound may be localized to the first position via a space inside the instrument panel. In this case, the space inside the instrument panel is effectively used as an engine sound transmission path.

The highly-sound-transparent section may have an opening formed in the dashboard and an air-sealing film covering the opening. In this case, the engine sound is transmitted effectively toward the cabin while air and liquid in the engine bay are prevented from flowing into the cabin.

The sound system may further include an alarm sound localizer configured to localize an alarm sound for issuing an alarm to a person in the vehicle, to a third position that is near an extension of a driver's line of sight when the driver looks forward. In this case, by causing the alarm sound to be heard from the extension of the forward line of sight where the driver focuses, the alarm becomes extremely effective.

DETAILED DESCRIPTION OF THE DISCLOSURE

Figure 1:
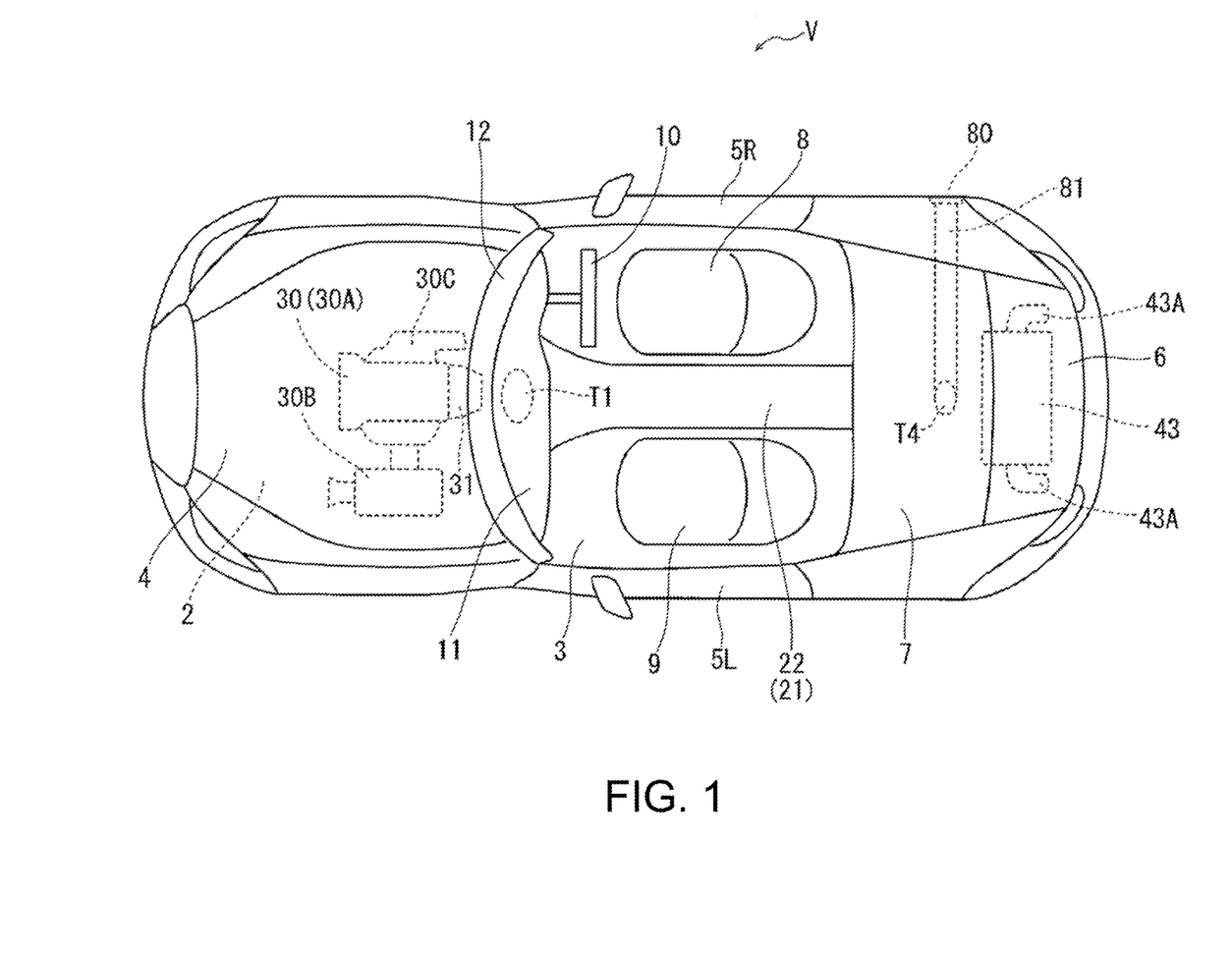
FIG. 1 is a plan view illustrating one example of a vehicle to which the present disclosure is applied.
Figure 2:
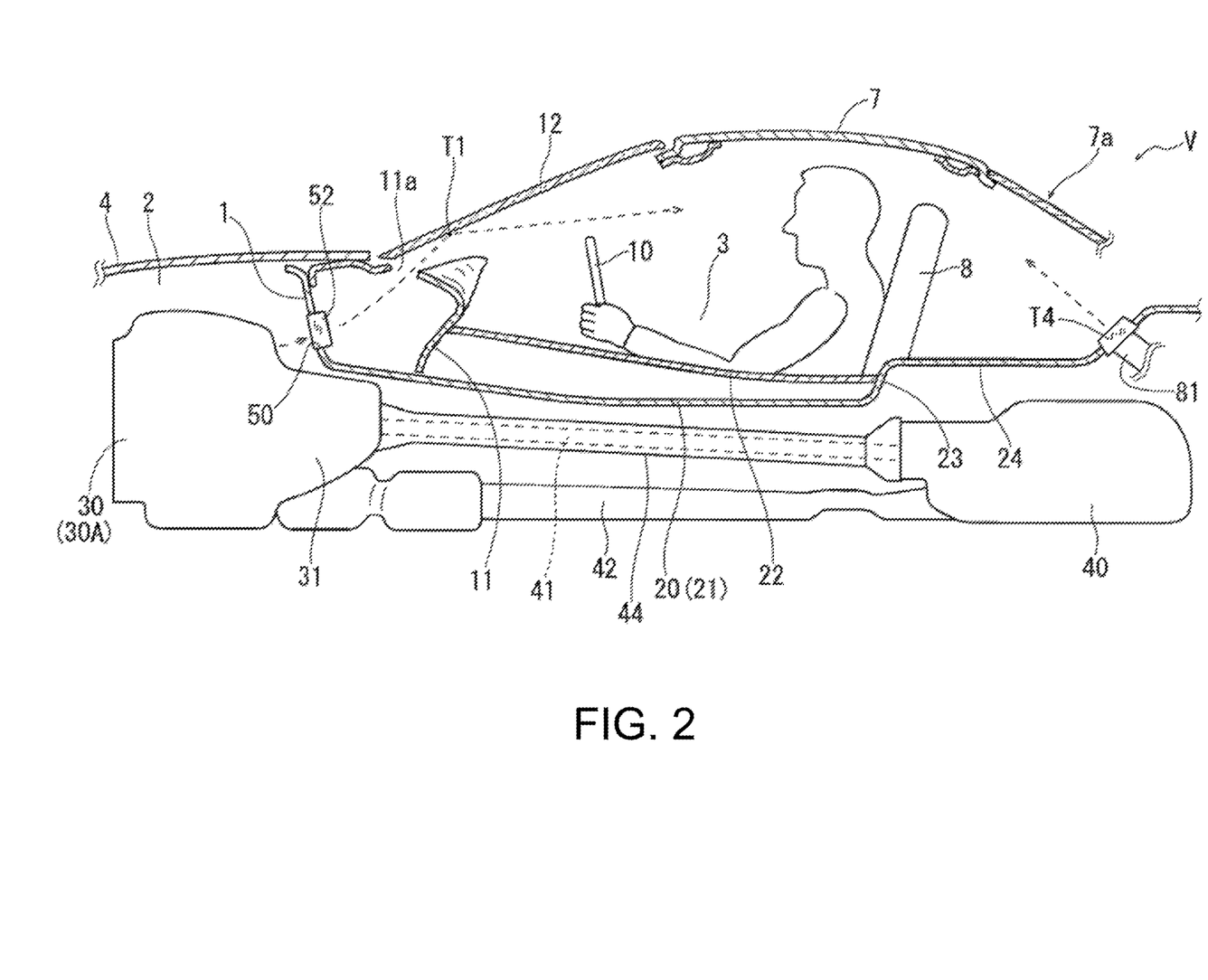
FIG. 2 is a partial cross-sectional side view of the vehicle illustrated in FIG. 1.

In FIGS. 1 and 2, a vehicle V of this embodiment is a two-door convertible. Here, the reference character "1" is a dashboard dividing an engine bay 2 from a cabin 3. The reference character "4" is a hood covering the engine bay 2 from the top thereof, the reference characters "5R" and "5L"

are a pair of left and right side-doors, the reference character "6" is a trunk lid, and the reference character "7" is a roof. Further, the reference character "8" is a driver seat, the reference character "9" is a front passenger seat, and the reference character "10" is a steering wheel. Additionally, the reference character "11" is an instrument panel and the reference character "12" is a front windshield.

As illustrated in FIG. 2, the roof 7 has a rear windshield 7a. FIG. 2 illustrates a state where the roof 7 is closed, i.e., the top of the cabin 3 is covered by the roof 7. Although FIG. 1 also illustrates the closed roof 7, the roof 7 is seen through and an upper end part of the front windshield 12 is partially cut out for the sake of illustration.

A floor panel 20 constituting a floor surface of the cabin 3 has a tunnel part 21 extending front-and-rear directions (longitudinal directions) of the vehicle in its center part in width directions (lateral directions, width directions) of the vehicle, and an upper surface of the tunnel part 21 is covered by a trim member 22. A rear end part of the floor panel 20 connects to a rear panel 24 via a kick-up part 23.

The engine bay 2 formed forward of the dashboard 1 is provided with an engine 30. The engine 30 of this embodiment is placed longitudinally. An engine body is denoted with "30A," an intake-system member is denoted with "30B," and an exhaust-system member is denoted with "30C." A transmission 31 is coupled to a rear part of the engine 30 (engine body 30A).

Note that although the engine 30 is equipped with auxiliary equipment, such as an alternator and an air-conditioning compressor which are driven by the engine body 30A, they are not illustrated. An engine sound is a mixture of a sound generated when the engine body 30A rotates or performs combustion, an intake sound, an exhaust sound, and also a sound of the auxiliary equipment being driven.

A differential (differential gear) 40 is disposed in a rear part of the vehicle V. The differential 40 is coupled to the transmission 31 (i.e., the engine 30) via a propeller shaft 41. That is, the vehicle V of this embodiment is a rear-wheel drive vehicle. Further, the transmission 31 and the differential 40 are coupled by an annular-shaped torque tube 44, and the propeller shaft 41 is disposed in the torque tube 44.

An exhaust passage 42 extends rearward from the engine 30. This exhaust passage 42 is connected to a muffler 43 disposed under the rear part of the vehicle. The muffler 43 is connected to a pair of left and right exhaust pipes 43A opening rearward. The exhaust gas is finally discharged outside (to the atmosphere) from the exhaust pipes 43A.

Figure 4:
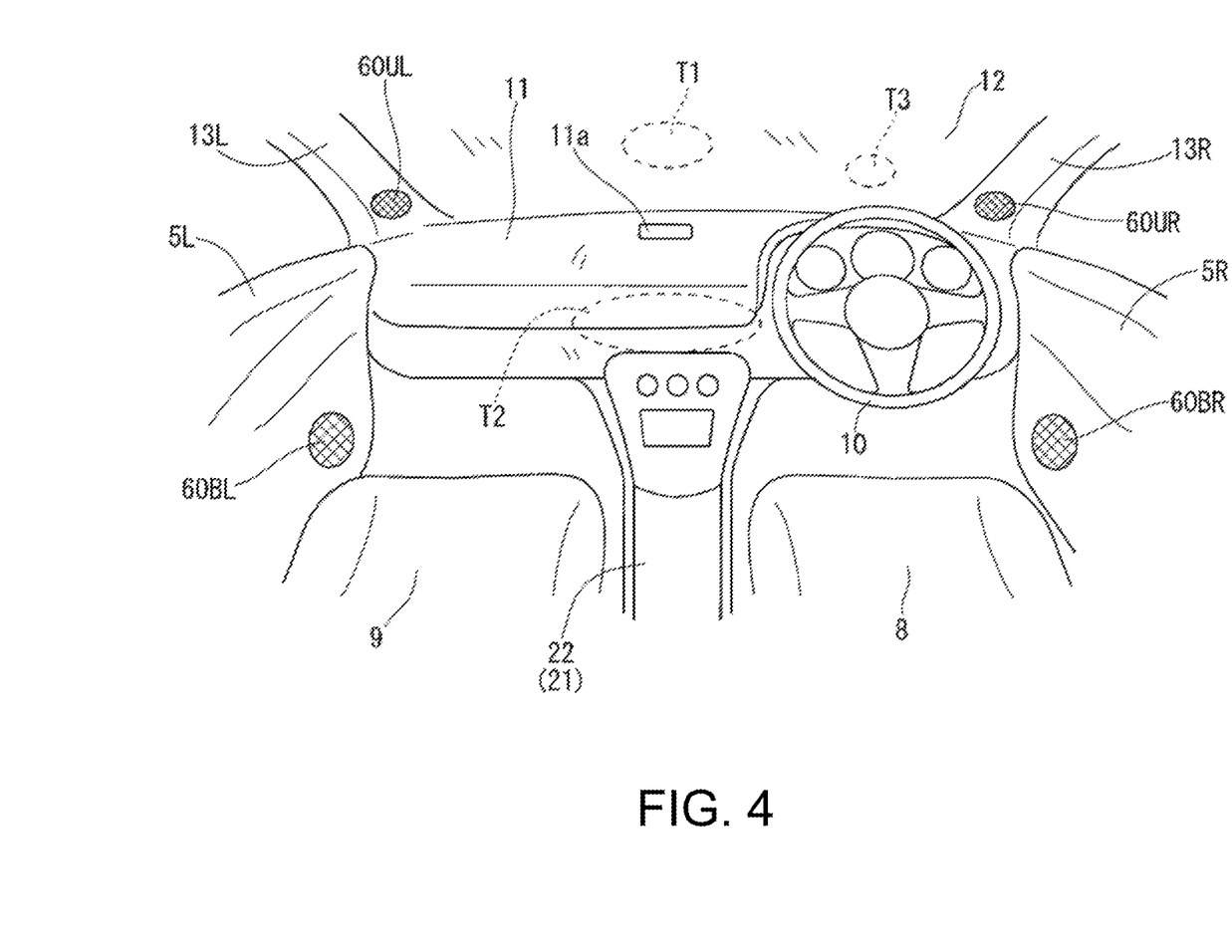
FIG. 4 is an elevational view of a cabin when looking forward from a rear part thereof, illustrating one example of localized positions of an engine sound, an audio sound, and an alarm sound.

Next, localization of the engine sound and an audio sound will be described. First, as illustrated in FIG. 4, a first position (section or area) to which the engine sound is localized is denoted with the reference character "T1," and a second position to which the audio sound is localized is denoted with the reference character "T2." Additionally, in this embodiment, an alarm sound is localized to a third position T3.

The first to third positions T1 to T3 are individually set to be located forward of a vehicle driver seated at the driver seat 8. That is, the first position T1 is set in the front windshield 12. For example, the first position T1 is set in a center part of the front windshield 12 in the width directions, substantially at the same height as the driver's eyes.

Further, the second position T2 is set at a position lower than the first position T1 by a given distance. For example, the second position T2 is set to be located in a substantially center part of a surface of the instrument panel 11 facing substantially rearward. This second position T2 is set to have a wider area than the first position T1 in the width directions (to cause both the driver and the front passenger hear the audio sound). Note that the first and second positions T1 and T2 are separated from each other by the given distance so that the engine sound and the audio sound are distinguishable from each other, and the given distance is at least 30 cm, more preferably 50 cm or more.

The third position T3 is set to be located in an extension of a driver's line of sight when the driver who is seated on the driver seat 8 looks forward. The third position T3 may be set, for example, in the front windshield 12. Although it may be further forward of the front windshield 12, it is more preferably set at a position at which information is presented to the driver by a head-up display.

Note that the areas of the localized positions T1, T2, and T3 are not limited to those illustrated and may be, for example, wider areas in the width directions and/or up-and-down directions of the vehicle. The position of T1 may be variable within the front windshield 12 according to the vehicle state, such as a steering angle.

Figure 3:
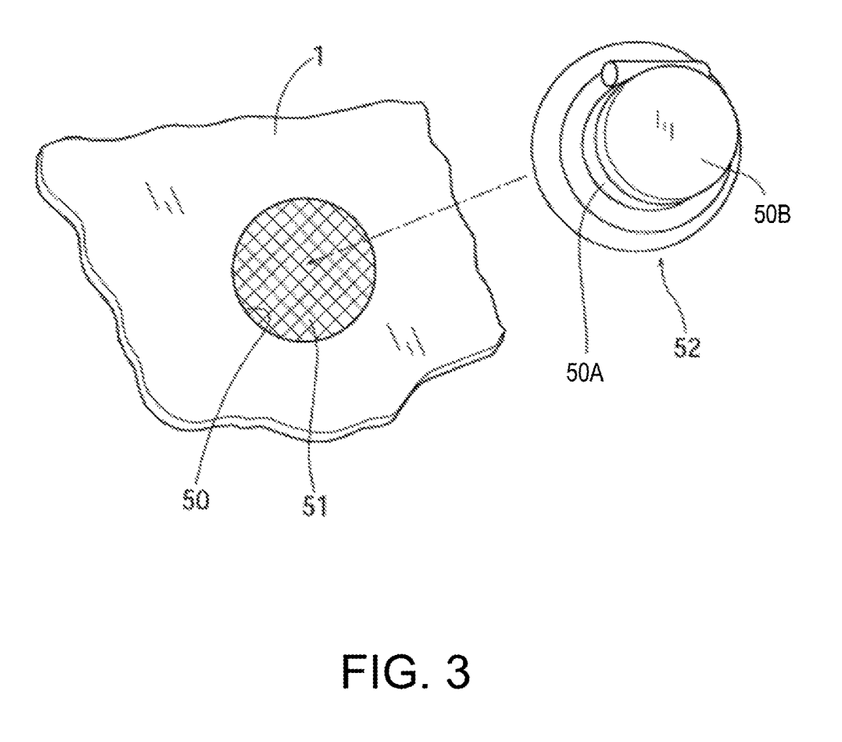
FIG. 3 is an exploded perspective view illustrating a structure of an engine sound transparent section formed in a dashboard.

Next, a specific structural example in which the engine sound is localized to the first position T1 will be described. First, as illustrated in FIG. 3, the dashboard 1 is formed with an opening 50 at a position equivalent to that of the engine 30 (engine body 30A) in height (up-and-down directions) and in the width directions. This opening 50 communicates the engine bay 2 with the inside of (a space formed by) the instrument panel 11. Further, the opening 50 is covered by a film member 51 that blocks air. Thus, the engine sound from the engine bay 2 is effectively transmitted into the instrument panel 11 by vibrating the film member 51.

The instrument panel 11 is formed with an opening 11a in its upper surface (see FIG. 2). The engine sound transmitted into the instrument panel 11 is further transmitted toward the front windshield 12 through the opening 11a and reflects on the front windshield 12 to be transmitted to the driver seated on the driver seat 8. Thus, the first position T1 is a section where the engine sound reflects on the front windshield 12. Air and liquid in the engine bay 2 are prevented from flowing into the cabin 3 by being sealed by the film member 51.

As illustrated in FIG. 3, the opening 50 covered by the film member 51 is attached with a valve member 52. The valve member 52 has a short cylindrical member 50A extending to the opening 50 and an electromagnetic valve body 50B that opens and closes the cylindrical member 50A. In this embodiment, the valve member 52 is normally fully opened so that the engine sound from the opening 50 is normally transmitted into the instrument panel 11 through the cylindrical member 50A. Note that the opening of the valve member 52 may be changeable according to a traveling state, etc. of the vehicle (e.g., the opening of the valve member 52 is increased as the engine sound or a vehicle speed increases). Any one or more of the components constituting the above-described structure that localizes the engine sound to the first position T1 may be referred to as the engine sound localizer.

For the localization of the audio sound to the second position T2, in this embodiment, as illustrated in FIG. 4, a total of four speakers, upper left and right speakers 60UL and 60UR and lower left and right speakers 60BL and 60BR are provided. The pair of upper left and right speakers 60UL and 60UR are full-range tweeter speakers and are attached to left and right front pillars 13L and 13R, respectively. The pair of lower left and right speakers 60BL and 60BR are also full-range tweeter speakers and attached to the left and right side doors 5L and 5R, respectively.

By using the four speakers 60UL, 60UR, 60BL, and 60BR, the audio sound is localized so as to be hearable from the second position T2 in a known manner of time alignment. Any one or more of the components constituting the above-described structure that localizes the audio sound to the second position T2 may be referred to as the audio sound localizer. One known method of localization through time alignment includes using a digital sound processor (DSP) such as DSP 70 described below with an appropriate algorithm. The DSP controls the phase and magnitude of the sound waves emitted by each speaker to align in such a way that some waves cancel each other out at certain locations where sound is not desired, and other waves are summed into a stronger wave at other locations where sound is desired. Using these techniques, the DSP 70 may process the audio signal for sounds emitted through each speaker to cause the perceived position of the sound to vary within the cabin of the vehicle.

Further, by using the four speakers 60UL, 60UR, 60BL, and 60BR, the alarm sound is localized so as to be hearable from the third position T3 in the manner of known time alignment. Thus, the alarm sound is superimposed on the audio sound and transmitted from the speakers 60UL, 60UR, 60BL, and 60BR. Any one or more of the components constituting the above-described structure that localizes the alarm sound to the third position T3 may be referred to as the alarm sound localizer.

Figure 5:
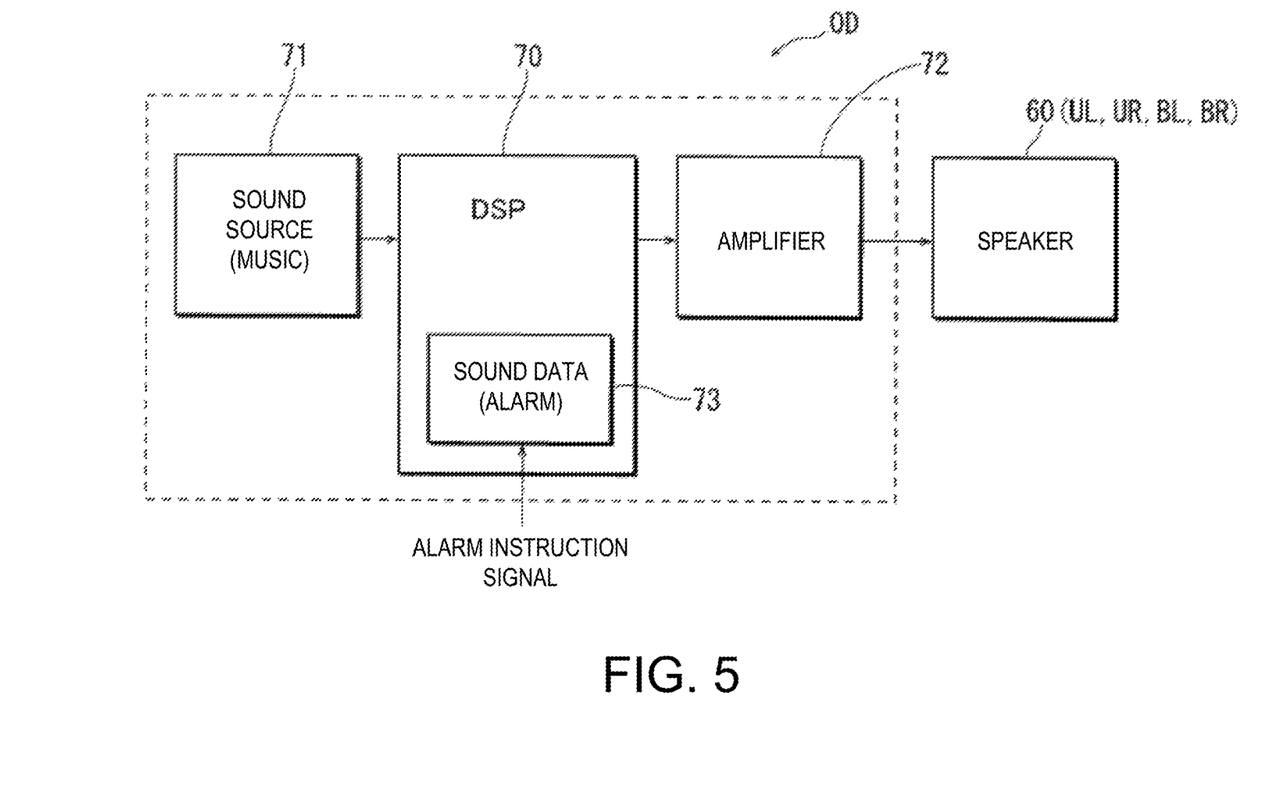
FIG. 5 is a block diagram illustrating one example of a control system of the present disclosure.

FIG. 5 illustrates one example of an audio device OD. In FIG. 5, the reference character "70" is a DSP. Once this DSP 70 receives a signal from a sound source 71 for audio, it performs the processing of time alignment described above so that the audio sound is localized to the second position T2, and operates the speakers 60UL, 60UR, 60BL, and 60BR via an amplifier 72.

The DSP 70 has a storage (memory) 73 storing alarm sound data (a model). Once the DSP 70 receives an instruction signal for issuing an alarm, it performs the processing of time alignment described above so that the alarm sound is localized to the third position T3, and drives the speakers 60UL, 60UR, 60BL, and 60BR via the amplifier 72.

In this embodiment, the exhaust sound is also localized. That is, a fourth position T4 where the driver is able to hear the exhaust sound is set in a substantially center part of a rear part of the cabin in the width directions (see FIGS. 1 and 2). This fourth position T4 is located at a structure in which a valve member is disposed at an opening leading into the cabin, and has substantially the same structure as that illustrated in FIG. 3, therefore the redundant description is omitted.

The fourth position T4 (the opening of the structure) is connected via a duct 81 with an extra chamber 80 opened to the outside and for ventilating air inside the cabin (see FIGS. 1 and 2). Since the extra chamber 80 is formed near the exhaust pipe 43A, the exhaust sound may effectively be transmitted to the fourth position T4. Note that the valve member at the fourth position T4 may normally be fully opened, or it may be closed when sports traveling is not expected, such as when running in an urban area or at a low vehicle speed. Moreover, the opening of this valve member may gradually be increased as an engine speed increases.

As described above, since the engine sound and the audio sound are both at the front of the driver and away from each other by a given distance, the driver is able to clearly distinguish the engine sound and the audio sound from each other. Thus, a driving operation is performed while clearly understanding the vehicle state by hearing the engine sound while enjoying the audio sound. Especially, recognizing more clearly the engine sound localized to the position close to the driver (driver's ear), which is a high position in the up-and-down directions, is extremely preferable for performing sports traveling.

Although the embodiment is described above, the present disclosure is not limited to the embodiment, and suitable changes are possible within the range described in the claims. The first position T1 may be set at a lower position than the second position T2 (e.g., the first position T1 is set at a position in or lower than an upper surface of the instrument panel 11, while the second position T2 is set at a position higher than the upper surface of the instrument panel 11). Moreover, the first position T1 may be set at a position on the driver side than the center part of the vehicle in the width directions (since the engine sound is more important information to the driver than to the front passenger). The number of speakers may be selected suitably, e.g., six or more, and the disposed positions thereof may also be selected suitably, e.g., dispose some of the speakers in the instrument panel 11.

The alarm sound may include a rev limiter sound that notifies a person(s) when the engine speed is reaching an upper limit. The localized position of the alarm sound is suitably changeable, but it is preferably different from that of the engine sound or the audio sound. Alternatively, the alarm sound may not be localized. Similarly, the exhaust sound may not be localized. The present disclosure is not limited to be applied to the convertible but is also applicable to various types of vehicles, such as a sedan type, a sport utility vehicle (SUV) type, and a four-wheel drive vehicle. The application may also be to a vehicle in which the transmission 31 is disposed in the rear part of the vehicle (at the position of the differential 40), a front-wheel drive vehicle having no propeller shaft 41 (i.e., a front-engine, front-wheel-drive (FF) vehicle), or a vehicle in which the engine 30 is disposed rearward of the cabin. It is needless to say that the purpose of the present disclosure is not limited to what is explicitly described, but also implicitly includes providing what is expressed as substantially preferable or advantageous.

The present disclosure is preferable for recognizing the engine sound and the audio sound individually while distinguishing them from each other.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1: Dashboard
2: Engine Bay
3: Cabin
5L, 5R: Side Door
8: Driver Seat
9: Front Passenger Seat
11: Instrument Panel
11a: Opening (For Engine Sound Transmission)
12: Front Windshield
13L, 13R: Front Pillar
20: Floor Panel
21: Tunnel Part
22: Trim Member
23: Kick-up Part 24: Rear Panel
30: Engine
31: Transmission
40: Differential
41: Propeller Shaft
42: Exhaust Passage
43: Muffler
43A: Exhaust Pipe
50: Opening (For Engine Sound Transmission)
51: Film Member
52: Valve Member
60UL, 60UR, 60BL, 60BR: Speaker
70: DSP
71: Sound Source (For Audio)
72: Amplifier
73: Storage (For Alarm Sound)
80: Extra Chamber
81: Duct

What is claimed is:

1. A sound system for a vehicle including an engine and an audio device for an internal space of a cabin as sound sources disposed at given positions of the vehicle, comprising:
an engine sound localizer configured to localize a first sound generated by the engine to cause a vehicle driver inside the cabin to hear the first sound from a first position; and
an audio sound localizer configured to localize a second sound generated by the audio device to cause the driver to hear the second sound from a second position, wherein
the first and second positions are located forward of the driver in front-and-rear directions of the vehicle and separated from each other by a given distance,
the first position is located upward of the second position,
the vehicle includes an instrument panel and a front windshield extending upward from a front-end part of the instrument panel,
the first position is set in the front windshield,
the second position is set in the instrument panel, and
a panel opening is formed on an upper surface of the instrument panel such that the first sound is transmitted from the panel opening toward the front windshield and reflected to the vehicle driver.

2. The sound system of claim 1, wherein
the engine is disposed in an engine bay formed forward of a dashboard defining a front end of the cabin, and
the dashboard is formed with a highly-sound-transparent section where transparency of the engine sound is higher than other sections.

3. The sound system of claim 2, wherein the highly-sound-transparent section faces into the instrument panel, and the engine sound is localized to the first position via a space inside the instrument panel.

4. The sound system of claim 3, wherein the highly-sound-transparent section has an opening formed in the dashboard and an air-sealing film covering the opening.

5. The sound system of claim 1, further comprising an alarm sound localizer configured to localize an alarm sound for issuing an alarm to a person in the vehicle, to a third position that is near an extension of a driver's line of sight when the driver looks forward.

* * * * *